United States Patent Office 2,883,238
Patented Apr. 21, 1959

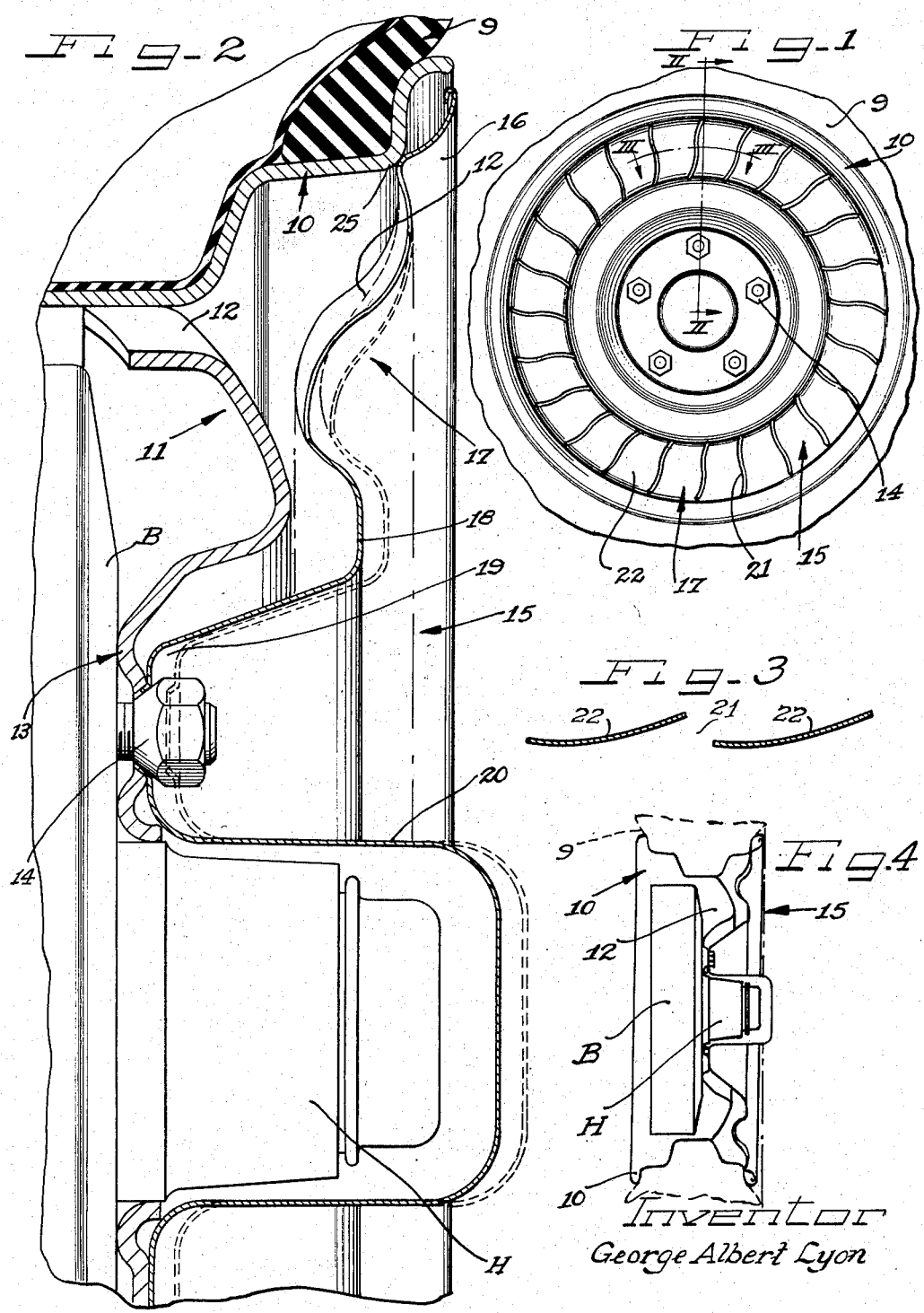

2,883,238

WHEEL COVER

George Albert Lyon, Detroit, Mich.

Application December 2, 1952, Serial No. 323,629

4 Claims. (Cl. 301—37)

This invention relates to wheel structures and more particularly to a decorative wheel cover for an automobile wheel.

In the manufacture of automobile wheels a manufacturing tolerance of as much as a quarter of an inch is allowed with respect to the relative displacement of the tire rim and body parts axially of the wheel. In addition, when a wheel goes around a corner, the tire rim tends to buckle or become cocked to a slight extent. Accordingly, I find it advantageous, for the proper retention of a wheel cover on a wheel, to provide for the accommodation, by the cover, of such variations.

An object of this invention is to provide a wheel cover for attachment to a wheel and which will accommodate variations existing between the tire rim and body parts of the wheel by reason of their relative displacement axially of the wheel.

Another object of this invention is to provide a wheel cover with generally radially spaced parts which not only serve to ornament the wheel cover but in addition define resilient air louvres which can yield in the fitting and attachment of the cover to the wheel.

In accordance with the general features of this invention, there is provided in a cover structure for a wheel including a tire rim part and a body part, a circular metallic sheet cover for the wheel comprising an outer annular portion, a central circular portion and an intermediate radially slotted resilient portion between and connecting the annular and circular portions with the annular portion displaced circumferentially with respect to the central portion so that the slots of the intermediate portion are skewed with the slotted portion being thereby formed into louvre like air vanes, and cover fastening means stressing the cover against the resiliency of the slotted portion and accommodating variations existing between the tire rim and body parts of the wheel.

Other objects and features of this invention will more fully appear from the following detailed description taken in connection with the accompanying drawings which illustrate several embodiments of the invention, and in which:

Figure 1 is a fragmentary side view of a wheel having a cover embodying the features of this invention;

Figure 2 is an enlarged fragmentary cross-sectional view taken on substantially the line II—II of Figure 1 looking in the direction indicated by the arrows and showing by dotted lines the position of the cover prior to its being stressed and fastened in place by the central bolt means;

Figure 3 is an enlarged fragmentary cross-sectional view taken on substantially the line III—III of Figure 1 looking downwardly; and Figure 4 is a diagrammatic or profile view in which the dot and dash line indicates the normal position of the rim and in which the full lines indicate how the rim can be cocked slightly as the wheel goes around a corner.

As shown on the drawings:

My invention or wheel cover is applicable to a conventional automobile wheel which includes the usual pneumatic tire and tube assembly 9 mounted in the conventional way upon a multi-flange drop center type of tire rim 10 which is, in turn, carried by a metal body part designated generally by the reference character 11. This body part 11 may be in the form of a stamping and defines spaced wheel openings 12 between it and the base of the tire rim 10 through which air can circulate in a manner well-known in this art. The central portion of the body part 11 is dished and formed into a bolt-on flange 13 adapted to be fastened in the usual way by detachable fastening elements, such as bolts and nuts 14, to the conventional brake drum housing B. Projecting from this brake drum housing B is the usual central hub portion H.

Now, cooperable with this wheel is a metallic sheet wheel cover designated generally by the reference character 15 and which embodies the features of this invention.

This cover includes an outer annular portion 16, an intermediate radially slotted resilient portion 17, a radially inner annular portion 18, and an apertured indented portion 19 adapted to be detachably secured to the wheel flange portion 13 by the bolts and nuts 14. When thus secured on the wheel, it will be appreciated that the nuts of the bolt and nut assemblies 14 are readily accessible from the exterior of the cover to enable removal of the cover from the wheel.

The cover, if it is so desired, may also be provided with a central hub covering cap like portion 20 for concealing the wheel hub.

The wheel cover 15 may be made from any suitable sheet metal although I contemplate preferably making it from a stamping of sheet metal that lends itself to a high lustrous polish and finish such, for example, as stainless steel sheet.

My invention is especially concerned with the intermediate slotted portion 17 which can be formed in accordance with the method disclosed in my co-pending application, Serial No. 311,933 filed September 27, 1952, now Patent Number 2,828,838. Briefly, according to this method, the portion 17 is first provided with radial slits 21 uniformly spaced about the axis of the wheel. Then the annular portion 18 of the cover is held in a press and the outer portion is displaced circumferentially with respect to the held annular portion 18 so that the slots of the intermediate portion 17 are skewed. As disclosed in my co-pending application, this skewing of the slotted portion results in the separated parts of this portion being bulged and formed into louvre-like air vanes as best shown at 22 in Figures 2 and 3. These vanes are aligned with the wheel openings 12 and are adapted to scoop up air in the rotation of the wheel in addition to providing an ornamental appearance for the wheel cover.

Now I propose, in accordance with the features of this invention, to utilize this slotted or louvre portion 17, by reason of its resiliency, for an additional purpose, namely, that of accommodating manufacturing tolerance or variation in the relative axial locations of the rim and body parts 10 and 11 of the wheel. This tolerance may amount to as much as a quarter of an inch. In other words, for example, the location of the body part with respect to the axis of the wheel may be moved in and out to the extent of a quarter of an inch.

Now, it will be appreciated that, if the cover is to bottom against both the rim and body parts and to bridge the gap therebetween, it cannot effectively do so if the location of these parts varies unless something gives. Therefore, I propose to utilize the resiliency of the louvre portion 17 so that this portion can serve as a resilient diaphragm which will yield as the cover portion 19 is fastened in place on the wheel body flange portion 13. In order to show this, I have illustrated the cover, in Figure 2, in dotted lines prior to it being tightened into position and have shown how it yields as it is pulled inwardly by the tightening means and against the shoulder 25 of the tire rim 10. In this manner the cover can bottom at 25 on the tire rim 10 and can also bottom on the wheel body flange 13.

Another advantage of making use of the resiliency of the louvre portion 17 resides in the fact that, when the cover goes around a corner and tends to buckle or become cocked from the dot and dash line position shown in Figure 4 to the full line position, the cover must yield or it is apt to buckle. I find that the resiliency or diaphragm-like action of the louvre portion 17 permits this cocking of the cover, as shown by the full line position in Figure 4, without damaging the cover and still enables a tight seating of the cover on the wheel.

I claim as my invention:

1. In a cover structure for a wheel including a tire rim part and a body part, a circular one piece disk metallic sheet cover for said wheel comprising an outer annular portion, a central circular portion and an intermediate radially slotted resilient portion between and connecting said annular and circular portions with said annular portion displaced circumferentially with respect to said central portion from the normal position thereof in the original metallic sheet so that the slots of said intermediate portion are skewed and set with the slotted portion being thereby formed into louvre like air vanes, and cover fastening means stressing said cover against the resiliency of said slotted portion by bottoming of said outer annular portion against the rim part and the central portion against the body part and thereby accommodating variations existing between the tire rim and body parts of the wheel.

2. In a cover structure for a wheel including a tire rim part and a body part, a circular one piece disk metallic sheet cover for said wheel comprising an outer annular portion bearing against the tire rim part, a central circular portion adapted to be fastened to said wheel body part and an intermediate radially slotted resilient portion between and connecting said annular and circular portions with said annular portion displaced circumferentially with respect to said central portion from the normal position thereof in the original metallic sheet so that the slots of said intermediate portion are skewed and set with the slotted portion being thereby formed into louvre like air vanes, and cover fastening means for securing said central portion to said wheel body part and for stressing said cover against the resiliency of said slotted portion by bottoming of said outer annular portion against the rim part and the central circular portion against the body part and thereby accommodating variations existing between the tire rim and body parts of the wheel.

3. In a cover structure for a wheel including a tire rim part and a body part, a circular one piece full disk metallic sheet cover for said wheel comprising an outer annular portion, a central circular portion and an intermediate radially slotted resilient portion between and connecting said annular and circular portions with said annular portion displaced circumferentially with respect to said central portion so that the slots of said intermediate portion are skewed with the slotted portion being thereby formed into louvre like air vanes, and cover fastening means stressing said cover against the resiliency of said slotted portion and accommodating variations existing between the tire rim and body parts of the wheel, said central portion being indented toward the wheel body part about a central axially outwardly projecting wheel-hub-covering cap portion and said fastening means comprising bolt means disposed in accessible position about said cap portion in said indentation and attached to said wheel body part.

4. In an automobile wheel structure including a wheel body carrying a tire rim and having a central circular centrally apertured bolt-on flange with attachment screw elements for attaching the bolt-on flange to a brake drum housing with a substantially axially outwardly projecting central hub extending from the brake drum housing and through said bolt-on flange aperture, a cover for disposition at the outer side of a vehicle wheel including a central cap-like axially outwardly projecting hollow portion for encompassing and concealing the axially outwardly projecting hub and of a diameter to fit closely about the hub and spaced radially inwardly substantially relative to the screw elements to afford adequate clearance for wrench engagement and manipulation of the screw elements, the axially inner portion of said hub-encompassing cover portion being joined to a radially outwardly extending axially inwardly facing annular portion engageable retainingly with the attachment screw elements, said annular portion joining at its radially outer side a generally axially outwardly and then radially outwardly extending substantially rigid portion of the cover merging with a radially outwardly extending resilient portion for overlying the radially outer portion of the wheel body and the tire rim and having a reinforced annular margin engageable with the tire rim, said margin normally extending axially inwardly to a position such that it engages the tire rim and tends to maintain said annular screw element engageable portion spaced from said bolt-on flange, said screw element engageable portion being drawn into engagement with the bolt-on flange by flexure of said radially extending resilient portion between said rigid portion and said marginal portion, whereby said marginal portion is held under resilient tension against the tire rim, said flexible radially extending portion being transversely sub-divided into a plurality of resilient spoke-like strips and affording openings through the cover.

References Cited in the file of this patent

UNITED STATES PATENTS

| | | |
|---|---|---|
| 1,414,043 | Riblett | Apr. 25, 1922 |
| 1,580,011 | Bugatti | Apr. 6, 1926 |
| 2,016,395 | Sinclair | Oct. 8, 1935 |
| 2,249,568 | Shinliver | July 15, 1941 |
| 2,491,504 | Lyon | Dec. 20, 1949 |
| 2,491,505 | Lyon | Dec. 28, 1949 |
| 2,541,079 | Lyon | Feb. 13, 1951 |

FOREIGN PATENTS

| | | |
|---|---|---|
| 787,597 | France | Sept. 25, 1935 |